No. 863,849. PATENTED AUG. 20, 1907.
H. T. HERR.
LOAD BRAKE APPARATUS.
APPLICATION FILED DEC. 1, 1904.
2 SHEETS—SHEET 1.
*Fig. 1.*
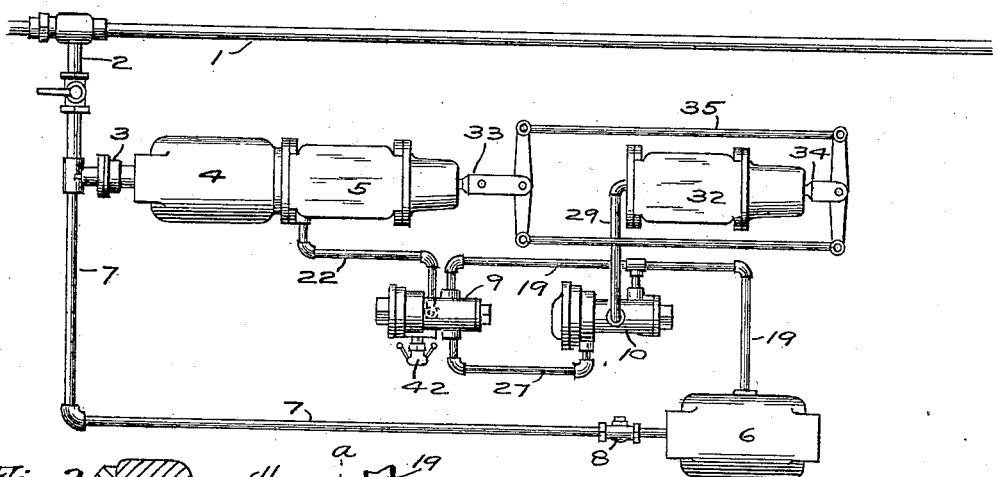
*Fig. 2.*
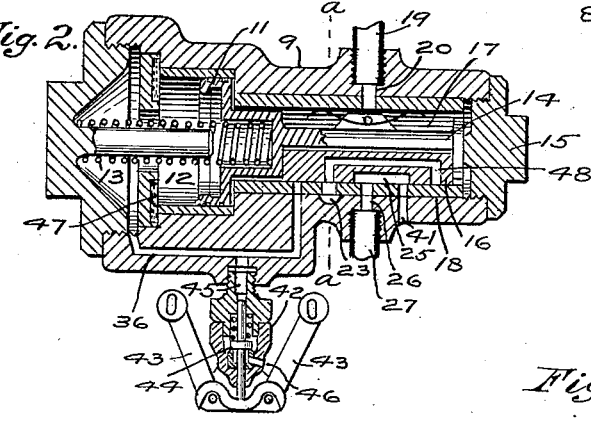
*Fig. 3.*
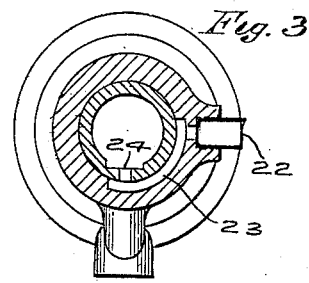
*Fig. 4.* *Fig. 8.*
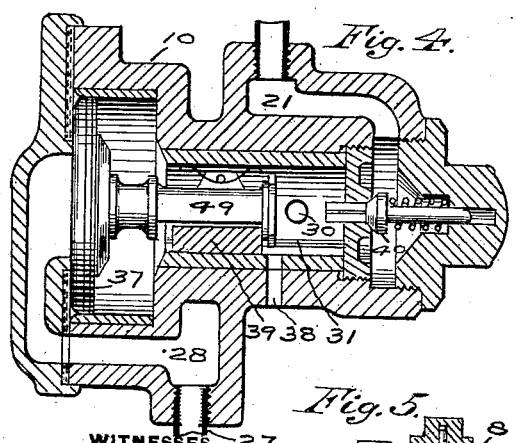
*Fig. 5.*
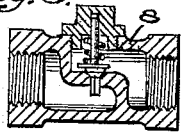
WITNESSES
J. S. Custer
James B. MacDonald
INVENTOR
Herbert T. Herr
by Wright
Att'y.

No. 863,849. PATENTED AUG. 20, 1907.
H. T. HERR.
LOAD BRAKE APPARATUS.
APPLICATION FILED DEC. 1, 1904.

2 SHEETS—SHEET 2.

WITNESSES
J. W. Custer
James B. MacDonald

INVENTOR
Herbert T. Herr
by E. Wright
Att'y.

UNITED STATES PATENT OFFICE.

HERBERT T. HERR, OF DENVER, COLORADO, ASSIGNOR TO THE WESTINGHOUSE AIR BRAKE COMPANY, OF PITTSBURG, PENNSYLVANIA, A CORPORATION OF PENNSYLVANIA.

LOAD BRAKE APPARATUS.

No. 863,849.  Specification of Letters Patent.  Patented Aug. 20, 1907.

Application filed December 1, 1904. Serial No. 234,978.

*To all whom it may concern:*

Be it known that I, HERBERT T. HERR, a citizen of the United States, residing in Denver, county of Denver, and State of Colorado, have invented a certain new and useful Improvement in Load Brake Apparatus, of which the following is a specification.

My invention relates to fluid pressure brakes for railway cars. Its object is to provide for the application of the brakes with a force which may be varied in accordance with the loaded, or empty, or lightly loaded condition of a car; and it consists in new and improved means whereby the desired variation of the braking force may be effected.

My improvement is applicable to fluid pressure brake systems generally, whether automatic or direct; and especially provides for the application of an increased braking force by fluid under pressure from a supplemental reservoir acting on the piston of a supplemental brake cylinder, when an increased or additional braking force is required.

Figure 6:
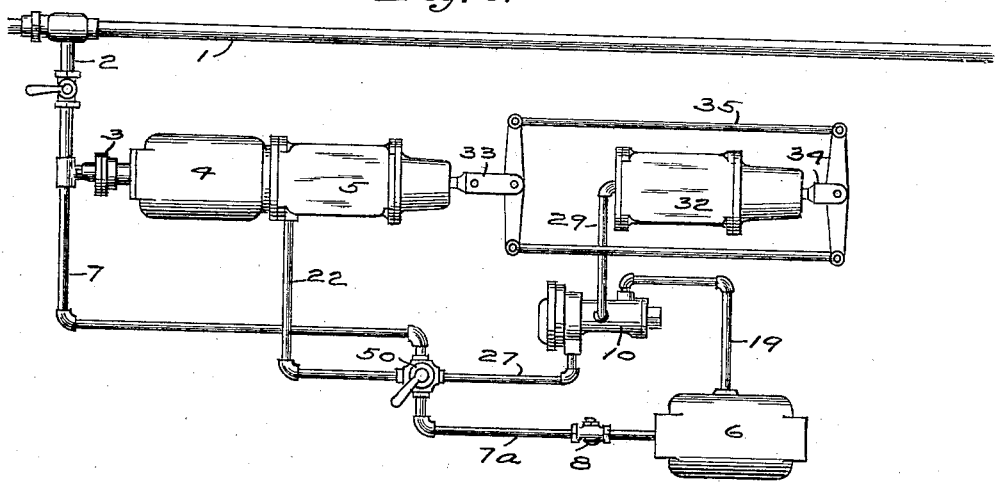
Figure 7:
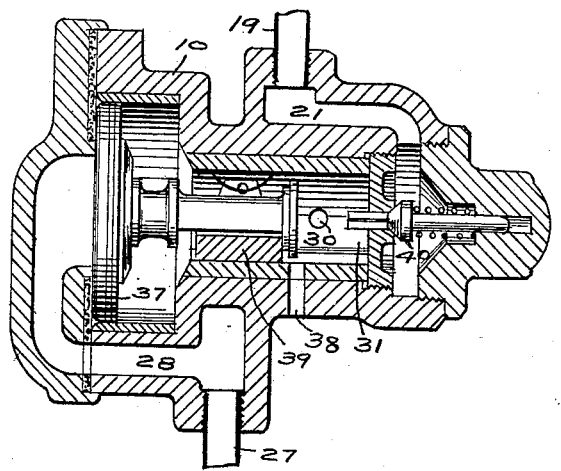

In the accompanying drawings, which illustrate my invention, Figure 1 is a plan view, showing my improvement applied to an automatic fluid pressure brake system; Fig. 2 a central section through the controlling valve device of my improvement; Fig. 3 a section on the line *a—a* of Fig. 2; Fig. 4 a central vertical section of the application and release valve device for the supplemental brake cylinder; Fig. 5 a section through the check valve device through which fluid under pressure is supplied from the train pipe to the supplemental reservoir; Fig. 6 a plan view showing a modification of my improvement applied to an automatic fluid pressure brake system; Fig. 7 a section of the application and release valve similar to that shown in Fig. 4, but which in the modification shown in Fig. 6 is differently connected; and Fig. 8 a modification of the application and release valve device.

As shown in Fig. 1 of the drawings, the train pipe, 1, branch pipe, 2, triple valve device, 3, auxiliary reservoir, 4, and brake cylinder, 5, may be of the ordinary construction and arrangement as employed in the Westinghouse, or other, fluid pressure brake systems. In addition thereto, I employ, in the construction shown in Figs. 1, 2, 3, 4, and 5, a supplemental reservoir, 6, to which fluid under pressure is supplied through the pipe 7 and check valve 8; a controlling valve device, 9, an application and release valve device, 10, and a supplemental brake cylinder, 32.

In the controlling valve device, 9, shown in section in Fig. 2, a piston, 11, is fitted in a chamber, 12, and is normally held in the position shown by a spring, 13, so that its stem, 14, abuts against a stop in the cap 15. A slide valve, 16, in the chamber, 17, is fitted to and moved by the stem 14, to control the ports shown in the bushing, 18, in the different positions of the piston 11. Chamber 17 of the controlling valve device is connected, by means of the pipe 19 and the passage 20, with the supplemental reservoir, 6, and the pipe 19 also connects the supplemental reservoir, 6, with the passage 21 in the casing of the application and release valve device 10, as shown in Figs. 1 and 4. The main brake cylinder, 5, is connected by means of the pipe 22 with a passage, 23, in the casing of the controlling valve device; and the port 24, opening therefrom, is shown blanked, or closed, by the slide valve 16; but when the piston 11 and the valve 16 are moved to the left, the port 24 is connected by means of the slide valve cavity 25, with the port 26, and through the pipe 27 with the passage 28 of the application and release valve. 10. Through a pipe 29 and a passage 30, the chamber 31 of the application and release valve 10 is always in open communication with the supplemental brake cylinder 32. The piston rod 33 of the brake cylinder 5 is connected by means of a yoke, or frame, 35, or may be otherwise connected, to the piston rod 34 of the brake cylinder 32; and when fluid under pressure acts in either or both of the brake cylinders, the piston rods or push bars of both cylinders are moved outward.

When fluid under pressure is admitted to the train pipe for charging the brake system, the auxiliary reservoir, 4, is charged, as usual, through the triple valve device, 3; and, at the same time, the supplemental reservoir, 6, is charged through the pipe 7 and the check valve 8. The chamber 17 of the controlling valve device, 9, and the passage 21 of the application and release valve device, 10, are at the same time charged with fluid under the same pressure as exists in the supplemental reservoir, since they are always in communication therewith through the pipe 19.

In charging the system with fluid under pressure, the gradually increasing pressure of the fluid, in the chamber 17 of the controlling valve device, acts on the right side of the piston 11, but the piston is not moved to the left, as such movement is resisted by the spring 13 and by the fluid under pressure which, leaking by the piston 11, accumulates in the chamber 12 on the left of the piston. The only passage for the escape of air from the chamber 12, on the left of the piston 11, is the passage 36, and that is closed by the slide valve 16 when the parts are in the positions shown in Fig. 2.

While the parts are in the positions shown in Figs. 2 and 3, and the system is charged with fluid under pressure, the chambers 17 and 12 of the controlling valve device, on both sides of the piston 11, are charged with supplemental reservoir pressure; and the piston 37 of the application and release valve device, Fig. 4, is exposed on both sides to atmospheric pressure. The chamber 31 of the application and release valve device is in direct communication with the atmosphere through the port 38, which is uncovered by the valve 39; the passage 21, which is charged with pressure from the supplemental reservoir, is cut off from communication with the chamber 31 by means of the spring pressed application valve 40; and the space on the left of the piston 37 is open to the atmosphere through the passage 28, pipe 27, and ports 26 and 41 of the controlling valve device, which ports are connected by the cavity 25 in the slide valve 16.

For braking empty, or lightly loaded, cars, the parts remain in the positions shown in Figs. 2 and 4, and the brakes may be applied and released as usual through the operation of the triple valve device; the piston of the brake cylinder 5 alone applying force to the brake shoes. The piston rod of the brake cylinder 32 will be moved out and in, coincidently with the piston of the cylinder 5, but will not apply any additional pressure to the brake shoes.

When it is desired to apply the brakes with increased force on account of the loaded condition of the cars, or for any other reason, my improvement is rendered operative by the means of the release valve device 42, having arms 43 which are operated by means of rods extending outward to the opposite sides of the car. A movement of either of the arms, 43, will unseat the valve 44 and permit the fluid under pressure in the chamber 12, on the left of piston 11 to escape through passages 36 and 45, and through port 46 to the atmosphere. The sudden reduction of pressure on the left of piston 11, caused by the opening of valve 44, will permit the pressure in chamber 17 to move piston 11 to the left and cause it to be seated on the gasket 47 so as to prevent any leakage of fluid under pressure around the piston from the chamber 17; and the piston 11 will remain in this position as long as the brake system is charged with fluid under a sufficient pressure for operating the brakes, or until the pressure in the supplemental reservoir has become sufficiently reduced to permit the spring 13 to move the piston 11 to the right; and this will occur only after the car has been disconnected or set out for unloading, when the pressure will leak off or the fluid under pressure is released from the system by "bleeding".

When the piston 11 is moved to the left and seated on the gasket 47, the slide valve 16 is moved to the left into a position in which the passage 36 in the casing is connected, by means of the passage 48 in the slide valve 16, with the port 41 opening to the atmosphere; and the cavity 25 in the slide valve connects the port 24 and passage 23 with the port 26 to which the pipe 27 is connected. The main brake cylinder, 5, will then be connected through the pipe 22, passage 23, port 24, slide valve cavity 25, port 26, pipe 27, and the passage 28, in the application and release valve device, with the space on the left of the piston 37 of the release valve device.

When the application and release valve device has been connected, as described, with the main brake cylinder 5, and the brakes are applied by the operation of the triple valve device, fluid under pressure will flow from the brake cylinder 5, by the connections already described, to the space on the left of the piston 37 of the application and release valve device, and the piston 37 and slide valve 39 will be moved to the right so as to close the port 38 and to unseat the valve 40 by contact therewith of the piston stem 49. Fluid under pressure from the supplemental reservoir will then flow through the pipe 19, passage 21, chamber 31, passage 30, and pipe 29, to the supplemental brake cylinder 32, and the brakes will be applied with the increased force due to the pressure exerted in the supplemental brake cylinder.

When the pressure in the supplemental brake cylinder and in the chamber 31 have nearly equalized with the pressure on the left of the piston 37, the piston 37 will move to the left so as to permit the closing of the valve 40, and the supplemental reservoir will be cut off from the supplemental brake cylinder. The movement of the piston 37 to the left, which permits the closing of the application valve, 40, is just sufficient to take up the lost motion between the slide valve 39 and the stem 49 without moving the slide valve; and any increase of pressure in the main brake cylinder 5 and in the space on the left of the piston 37 will move the piston and its stem back again into position to re-open the application valve, 40, which will permit a further flow of fluid under pressure into the supplemental brake cylinder, thereby increasing the force of the application. When the pressure in the supplemental reservoir has again nearly equalized with that in the main brake cylinder and in the space on the left of the piston 37, the piston 37 will again move to the left far enough to permit the closing of the valve, and the supplemental reservoir will again be cut off from the supplemental brake cylinder. In this manner the pressure in the supplemental brake cylinder may be increased with each increase of pressure in the main brake cylinder.

In releasing the brakes, the reduction of pressure in the main brake cylinder, 5, and in the space on the left of the piston 37 will permit the pressure of the fluid in the supplemental reservoir and in the chamber 31 to move the piston 37 and the slide valve 39 to the left so as to uncover the port 38, and permit the release of fluid under pressure from the supplemental brake cylinder. A complete release of pressure from the main brake cylinder will cause a complete release of pressure from the supplemental brake cylinder, and a partial release of pressure from the main brake cylinder will cause only a partial release of fluid under pressure from the supplemental brake cylinder; the piston 37 and slide valve 39 being moved back to the right so as to close the exhaust port 38 when the pressure in chamber 31 has been reduced somewhat below that in the main brake cylinder and passage 28.

When the brake system is not charged with fluid under pressure, or the pressure in the supplemental reservoir is not sufficient to hold the piston 11 seated on the gasket 47, in opposition to the pressure on the spring 13, the piston 11 and the slide valve 16 of the controlling valve device 10 will be automatically moved to the right into the positions shown in Fig. 2, and the system will be in condition for light load braking by means of the brake cylinder 5 only. This automatic action of the controlling valve device will be effected whenever the system is "bled", or the pressure in the system leaks off, as, for example, when the cars are disconnected, or set out for unloading.

It will be seen that the only pressure of fluid required in the chamber 17, of the controlling valve device, for the operation of my improvement, is such a pressure as will be sufficient to move the piston 11 and the slide valve 16 to the extremity of its stroke to the left, against the resistance of the spring 13, when the pressure on the left of the piston 11 has been suddenly reduced; and as this pressure in the chamber 17 may be much below that required or employed in the supplemental reservoir, in the course of the operation of my improvement, it will be evident that there is no necessity for limiting the connection of the chamber 17 to the supplemental reservoir, but that such connection may be made with any other source of fluid under pressure in the system, which remains charged with a sufficient pressure while the system is in operative condition. It is immaterial, therefore, whether the chamber 17 be connected with the supplemental reservoir, with the ordinary auxiliary reservoir, or with any other source of fluid under pressure which will provide sufficient pressure to effect the desired operation. In any case, the connection of chamber 17 with its source of supply does not draw off any material quantity of fluid from, or effect any material reduction or variation of pressure, in such source of pressure.

In Figs. 6 and 7 of the drawings, I have shown an application of my improvement in which the controlling valve device, 9, shown in Figs. 1 and 2, is dispensed with; the application and release valve device 10, shown in Figs. 6 and 7, being of the same construction as that shown in Figs. 1 and 4, but differently connected on account of the omission of the controlling valve device.

As shown in Fig. 6, the parts of the ordinary automatic fluid pressure brake system are the same as those shown in Fig. 1, and the piston rods of the main and supplemental brake cylinders are shown connected as in Fig. 1. In the construction shown in Fig. 6, I employ a plug cock, 50, to be operated by hand, for connecting the supplemental reservoir, through the branch pipes 7 and 7$^a$, with the train pipe, or disconnecting it therefrom; and, by means of the same plug cock, the application and release valve, 10, is connected, through the branch pipes 27 and 22, with the main brake cylinder 5, this connection being made through the plug cock when the cock is in position to connect the supplemental reservoir with the train pipe. When the plug cock is in position to cut off the supplemental reservoir from the train pipe, the application and release valve 10 is cut off from the main brake cylinder. With the plug cock, 50, in position to cut out the supplemental reservoir and the application and release valve, 10, the brakes may be applied and released, as usual, by the application and release of pressure in the main brake cylinder, 5; the piston rod or push bar of the supplemental brake cylinder moving in either direction without applying any additional pressure.
When the plug cock, 50, is in position to connect the supplemental reservoir with the train pipe, and the system is charged with fluid under pressure, fluid under pressure will flow, from the train pipe, through the pipes 7 and 7$^a$, and through the check valve 8, into the supplemental reservoir, 6, and, through the pipe 19, into the passage 21 of the application and release valve. At the same time the passage 28 of the application and release valve device will be connected with the main brake cylinder 5, through the pipes 22 and 27, and through the plug cock, 50.

With the parts connected as described, when an application of the brakes is made, fluid under pressure from the main brake cylinder, 5, acting on the piston 37, will move the piston 37 and the slide valve 39 to the right, closing the exhaust port 38 and opening the application valve 40 to admit fluid under pressure from the supplemental reservoir 6, through pipe 19, passage 21, chamber 31, passage 30, and pipe 29 to the supplemental brake cylinder 32; and the brakes will be applied with the increased force due to the pressure in both cylinders. With this modification of my improvement, the application and release valve device operates, as in my first described construction, to cut off the flow of fluid under pressure from the supplemental reservoir to brake cylinder 32, when the pressure in the cylinder 32 is nearly equal to that in the main brake cylinder; and it also operates to increase or decrease the pressure in the second brake, in accordance with the pressure in the main brake cylinder, and to release the fluid under pressure from brake cylinder 32 when the pressure is released from the brake cylinder 5.

By means of the check valve 8, reductions of pressure in the train pipe are prevented from causing any reduction or release of pressure from the supplemental reservoir through the pipes 7 and 7$^a$, shown in Fig. 6, or through the pipe 7, shown in Fig. 1. In both constructions, the capacity of the supplemental reservoir may be such that its variations of pressure need not coincide in degree with those in the ordinary auxiliary reservoir. It may be of such a capacity that its pressure will not equalize with that in the supplemental brake cylinder on a full application of the brakes; or its capacity may be great enough to supply two or more brake cylinders.
In this connection it may be observed that the regulation of pressure in the supplemental brake cylinder is due to the relative pressures in the main and supplemental brake cylinders, and is not dependent on or affected by any higher pressure existing in the supplemental reservoir.

In Fig. 8 of the drawings, I have shown a modification of the application and release valve device in which a slide valve, 51, operated by a piston 52, is employed for opening and closing a passage, 53, through which fluid under pressure is admitted from the supplemental reservoir to the chamber 31 and to the supplemental brake cylinder. The object of this construction is to provide comparatively large admission passages, or as large as may be desired, for the admission of fluid from the supplemental reservoir to the chamber 31 and to the supplemental brake cylinder, and at the same time to provide a more sensitive device than that shown in Figs. 4 and 7, without increasing the size of the piston 37. When the system is charged for operation, the chamber 55 is charged, through pipe 19, with fluid under pressure from the supplemental reservoir, and the chamber 56, on the right of the piston 52, the passage 57, and the chamber 54 are charged with fluid under pressure, which passes by the piston 52. The passage 53 is normally closed by the valve 51, which is held in position by the spring 58, and the valve 40$^a$ is held to its seat by the spring 59 and the fluid under pressure in the chamber 54. When the piston 37 and its stem 49 are moved to the right, by fluid under pressure from the main brake cylinder, the slide valve 39 closes the port 38 and the stem 49 abuts against the stem of the valve 40ᵃ and unseats that valve, permitting the release of pressure from the chamber 54, passage 57, and the chamber 56 on the right of piston 52. The pressure in chamber 55 will then move the piston 52 and slide valve 51 to the right so as to open the passage 53, and admit fluid under pressure from the supplemental reservoir to chamber 31 and to the supplemental brake cylinder. When the pressure in the second brake cylinder is substantially equal to that in the first brake cylinder the piston 37 is substantially balanced as to fluid pressures and the spring 59 acts to move the stem 49 and piston 37 back far enough to seat the valve 40ᵃ but not to open the port 38. The instant that the small valve 40ᵃ closes, the pressure equalizes around the piston 52 and the spring 58 moves the piston and slide valve 51 to close the port 53, thereby cutting off further supply of fluid to the second or supplemental brake cylinder. When the first brake cylinder is released by the action of the triple valve in the usual way the piston 37 with slide valve 39 moves back to release position and opens the exhaust port 38 of the second brake cylinder, as before described.

Having now described my invention, what I claim as new and desire to secure by Letters Patent is:—

1. In a fluid pressure brake system, the combination, with a main brake cylinder to which fluid under pressure is supplied for applying the brakes, of a supplemental brake cylinder, a supplemental reservoir and means, controlled by the pressure in the main brake cylinder, for supplying fluid under pressure from the supplemental reservoir to the supplemental brake cylinder.

2. In a fluid pressure brake system, the combination, with a brake cylinder to which fluid under pressure is supplied from one source of pressure for applying the brakes, of a second brake cylinder, and means controlled by the pressure in the first cylinder for supplying fluid under pressure from a second source of pressure other than the train pipe to the second cylinder.

3. In a fluid pressure brake system, the combination, with a brake cylinder to which fluid under pressure is supplied from one source of pressure for applying the brakes, of a second brake cylinder, a valve device, controlled by the pressure in the first cylinder, for supplying fluid under pressure from a second source of pressure other than the train pipe to the second cylinder, and means for rendering the valve device operative by pressure from the first brake cylinder.

4. In a fluid pressure brake system, the combination, with a brake cylinder, to which fluid under pressure is supplied from one source of pressure for applying the brakes, of a second brake cylinder, and means, controlled by the pressure in the first brake cylinder, for supplying fluid under pressure from a second source of pressure other than the train pipe to the second cylinder, and for releasing fluid under pressure from the second cylinder.

5. In a fluid pressure brake, the combination with a train pipe, auxiliary reservoir, a brake cylinder, and valve mechanism operated by variations in train pipe pressure for supplying fluid under pressure to the brake cylinder, of a second brake cylinder, another receptacle containing fluid under pressure, and means controlled by the pressure in the first brake cylinder for supplying fluid under pressure from said receptacle to the second brake cylinder.

6. In a fluid pressure brake, the combination with a train pipe, a brake cylinder, and valve mechanism operated by variations in train pipe pressure for supplying fluid under pressure to the brake cylinder, of a second brake cylinder, a reservoir, and means controlled by the pressure in the first brake cylinder for supplying fluid under pressure from the reservoir to the second brake cylinder.

7. In a fluid pressure brake, the combination with a main brake cylinder, and means for supplying fluid under pressure thereto, of a second brake cylinder, a reservoir, and means controlled by the pressure in the main brake cylinder for supplying fluid under pressure from the reservoir to the second brake cylinder and for releasing the same therefrom.

8. In a fluid pressure brake, the combination with a main brake cylinder, and means for supplying fluid under pressure thereto, of a second brake cylinder, a reservoir, and a valve device governed by the opposing pressures in the two brake cylinders for controlling the supply of fluid from the reservoir to the second brake cylinder and its release therefrom.

9. In a fluid pressure brake, the combination with a main brake cylinder and means for supplying fluid under pressure thereto, of a second brake cylinder, and valve mechanism operated by the opposing pressures of the two brake cylinders for controlling the supply of fluid under pressure to the second brake cylinder in service application.

10. In a fluid pressure brake system, the combination, with a main brake cylinder, a supplemental brake cylinder, and a supplemental reservoir, of means operative by pressure in the main brake cylinder to supply fluid under pressure from the supplemental reservoir to the supplemental brake cylinder, and operative by pressure in the supplemental brake cylinder to release fluid under pressure from the supplemental brake cylinder.

11. In a fluid pressure brake system, the combination, with a main brake cylinder, and means for supplying fluid under pressure thereto, of a second brake cylinder and a reservoir for supplying fluid under pressure thereto and means independent of the pressure in the reservoir for supplying fluid under pressure from the reservoir to the second brake cylinder.

12. In a fluid pressure brake cylinder, the combination, with a main brake cylinder, a supplemental brake cylinder, and a supplemental reservoir, of means for supplying fluid under pressure from the supplemental reservoir to the supplemental brake cylinder, and a controlling valve device which automatically renders such means inoperative.

13. In a fluid pressure brake system, the combination, with a main brake cylinder, a supplemental brake cylinder, and a supplemental reservoir, of an application and release valve device for supplying fluid under pressure from the supplemental reservoir to the supplemental brake cylinder, and a controlling valve device operative by fluid under pressure for controlling the operation of the application and release valve device.

14. In a fluid pressure brake system, the combination, with a main brake cylinder, a supplemental brake cylinder, and a supplemental reservoir, of a valve device for supplying fluid under pressure from the supplemental reservoir to the supplemental brake cylinder, and means actuated by fluid under pressure for rendering the valve device operative.

15. In a fluid pressure brake system, the combination, with a main brake cylinder, and a supplemental brake cylinder, of a valve device, a piston in the valve device, which is exposed on one side to main brake cylinder pressure and on the other side to supplemental brake cylinder pressure, and valve mechanism, operative by the movement of the piston, for supplying fluid pressure to and releasing it from the supplemental brake cylinder.

16. In a fluid pressure brake system, the combination, with a main brake cylinder, a supplemental brake cylinder, and a supplemental reservoir, of an application and release valve device, a piston in the valve device, which is exposed on one side to main brake cylinder pressure and on the other side to supplemental brake cylinder pressure, and valve mechanism, operative by the movement of the piston, for supplying fluid under pressure from the supplemental reservoir to the supplemental brake cylinder and releasing it therefrom.

17. In a fluid pressure brake system, the combination, with a main brake cylinder, a supplemental brake cylinder, and a supplemental reservoir, of a check or non-return valve through which the supplemental reservoir is charged from the train pipe, and a valve device, operative by pressure in the main brake cylinder, for supplying fluid under pressure from the supplemental reservoir to the supplemental brake cylinder.

18. In a fluid pressure brake system, the combination, with a main brake cylinder, a supplemental brake cylinder, and a supplemental reservoir, of an application and release valve device, operative by variations of pressure in the main brake cylinder, to supply fluid under pressure from the supplemental reservoir to the supplemental brake cylinder, and a controlling valve device comprising a piston and valve for connecting the application and release valve device with, and disconnecting it from, the main brake cylinder, and a manually operative valve for releasing fluid under pressure from one side of the piston to cause a movement of the valve whereby the application and release valve device is connected with the main brake cylinder.

In testimony whereof I have hereunto set my hand.

HERBERT T. HERR.

Witnesses:
A. M. CALHOUN,
DE LANCY BRIGGS.